April 5, 1927.
R. S. DUNLAP
SAUCE PAN
Filed Dec. 10, 1925
1,623,397
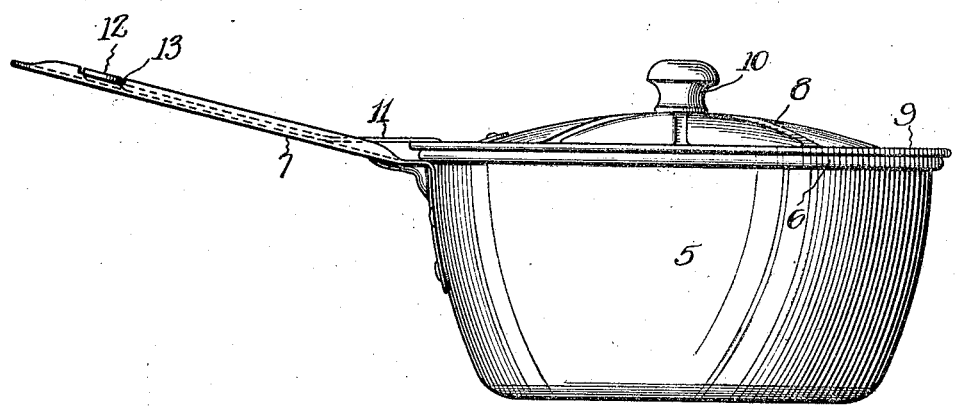
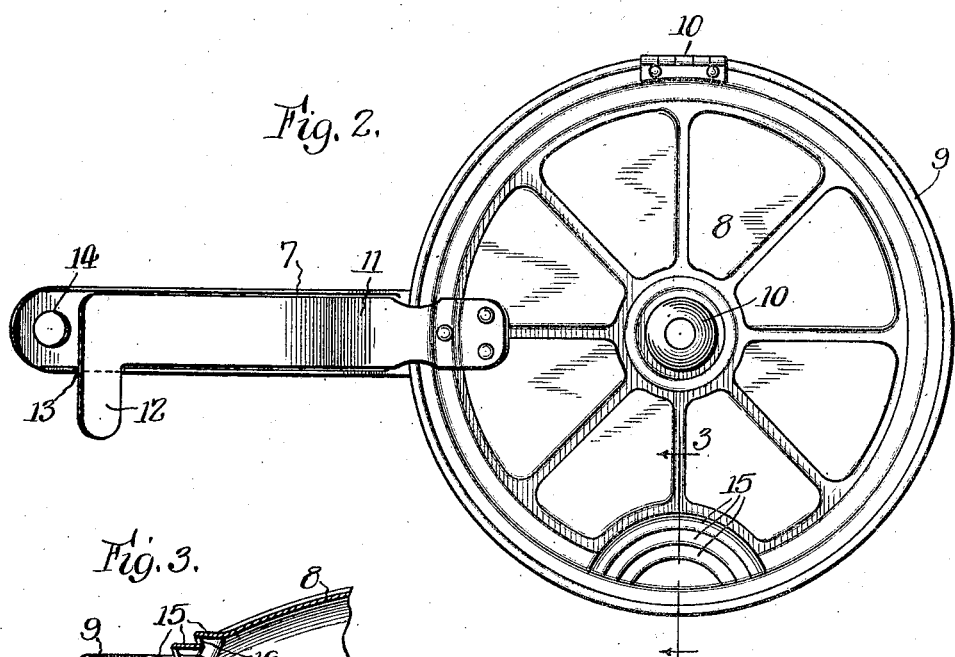
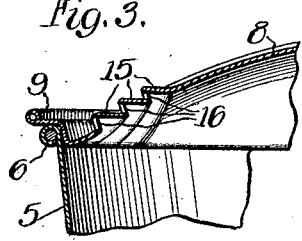
Inventor:
Ralph S. Dunlap,
By Samuel N. Pond, Atty.

Patented Apr. 5, 1927.

1,623,397

UNITED STATES PATENT OFFICE.

RALPH S. DUNLAP, OF CHICAGO, ILLINOIS.

SAUCEPAN.

Application filed December 10, 1925. Serial No. 74,461.

This invention relates to the general art of cooking utensils, and has reference more particularly to an improved utensil in the general nature of a sauce pan. Sauce pans are commonly equipped with a fixed radially extending handle, and with a lid or cover fitting the rim of the pan and having a central knob for applying and removing the lid.

In the ordinary use of such an article, the lifting of the lid from the pan while the contents of the latter are boiling subjects the hand of the cook to the danger of burning by the hot steam shooting upwardly from the contents. In a few instances it has been proposed to hinge the lid to the rim of the pan, so that the lid can be raised only by an upward and outward swinging movement, but, where the lid is raised and lowered by the usual central knob, the hand of the cook is still subjected to the danger of burning from the steam shooting out around the edges of the lid as the latter is raised.

The main object of my present invention is to provide an improved cooking utensil of this character wherein the lid may be opened when necessary during the cooking operation without any danger of burning or scalding the hand of the cook.

In some known constructions the lid is provided with a pour opening in one edge thereof to enable the hot water to be poured off without the necessity of lifting the lid. Unless this opening is covered during the cooking operation, there is a considerable loss of heat through the large volume of steam rising through the pour opening, as well as the possibility of contamination of the contents of the pan by dust, flies, etc. prior to the cooking operation; and where such opening is provided with a hinged or sliding cover, this of course becomes very hot, and can safely be manipulated only by a tool. Another object of my present invention, therefore, is to provide an improved steam vent and pour opening in the lid that will be sanitary in character and require no movable cover.

Other objects and attendant advantages will be apparent to those skilled in the art, as the invention becomes better understood by reference to the following detailed description, taken in connection with the accompanying drawing wherein I have illustrated a practical and preferred embodiment of the principle of the invention, and in which—

Fig. 1 is a side elevation of a sauce pan equipped with my improvements, the same being shown in closed position;

Fig. 2 is a top plan view of Fig. 1; and

Fig. 3 is a sectional detail through the steam vent and pour device of the lid, on the line 3—3 of Fig. 2.

Referring to the drawings, 5 designates a sauce pan of ordinary shape having the usual beaded upper rim 6, and a radially extending rigid handle 7. 8 designates the usual lid or cover of the pan that is formed with the beaded rim 9 overlying the rim 6 of the pan to close the latter. This lid may be equipped with the usual central knob 10, although the latter is not essential with the present invention.

The lid 8, instead of being entirely separate from the pan 5 is hinged at its edge to the edge of the latter as shown at 10′ in Fig. 2, at a point substantially ninety degrees from the handle 7. The lid 8 is further provided with a rigid radially extending handle 11, which may be either integral therewith or attached thereto, and this handle 11 is approximately coextensive lengthwise with the pan handle 7; which latter is of shallow channel form in cross-section, so that, when the lid is closed, its handle 11 nests within the pan handle 7 with its longitudinal edges in bearing engagement with the side walls of the channel. This enables both handles to be simultaneously grasped and held together by one hand of the cook, so that the pan may be inverted to drain off the hot water with the lid securely held closed. Moreover, the nesting of the lid handle within the pan handle relieves the hinge of all bending strain when the lid is closed since it locks the latter against any edgewise displacement, and the combined thickness of the nested handles is no greater than that of the pan handle alone. The nesting of the lid handle in the channel-shaped pan handle also avoids all chance of pinching the skin of the palm and fingers between the edges of the two handles, such as might easily occur in the case of two flat handles lying one on the other. To facilitate the raising of the lid through the lid handle, I preferably form on the outer end of the latter a short lateral extension 12 which, when the lid is closed with its handle 11 lying in the pan handle 7, extends through and beyond a notch 13 formed in one of the edge walls of the pan handle. The lid handle is preferably made slightly shorter than the pan handle, so as not to cover the usual hole 14 in the outer end of the pan handle by which the utensil is commonly hung on a hook or nail when not in use. The above described structure enables the lid to be raised and swung back by simply grasping the lug 12 between the thumb and forefinger and lifting the lid handle thereby, without exposing the hand to the steam rising from the open vessel.

My invention also comprehends an improved steam vent and pour opening in the lid which shall be operative without the necessity of raising the latter from the top of the pan. A portion of the lid adjacent to its periphery is crimped or corrugated in the form of a series of steps 15, best shown in the cross-sectional view, Fig. 3. Through the risers of the steps are formed a series of holes 16, so that the steam or hot water flowing through the holes issues in a direction substantially radially of the pan. Preferably, and as herein shown, the risers, in which the holes are formed, are rearwardly or inwardly inclined so that they are partially overhung by the treads, and the holes are thus to a considerable extent protected from the ingress of dust and dirt, thus giving to the vent and pour opening a sanitary character. This vent and pour opening may, of course, be employed to advantage on a free or non-hinged lid; but when employed with a hinged lid, as shown, it is preferably located at a point diametrically opposite to the hinge, so that, when the pan is tilted to pour off the hot water, it is suspended by the hinge and thus does not tend to slide off the edge of the pan, and at the same time the lid is held closed by the grip of the hand on the internested handles 7 and 11.

It is believed that the novel structural features of my invention, its mode of use, and the advantages inherent therein will be readily understood by persons familiar with this class of utensils from the foregoing description. While I have herein illustrated a practical and preferred embodiment of the invention, it is manifest that the same may be variously modified in respect to specific details without departing from the principle of the invention or sacrificing any of the advantages thereof, and hence I reserve all such variations and modifications as fall within the spirit and purview of the appended claims.

I claim—

1. The combination with a sauce pan having a radially extending handle of channel form, of a lid fitting the top edge of said pan and permanently hinged to said top edge at a point substantially ninety degrees from said handle, and a radially extending handle approximately coextensive lengthwise with said pan handle rigidly attached to the marginal portion of said lid and adapted to nest within the channel of said pan handle when the lid is closed.

2. A specific form of claim 1, wherein the channel-shaped handle of the pan is formed with a notch in one of its edge walls, and the lid handle is formed with a lateral handle-raising projection extending through and beyond said notch when the lid is closed.

3. A specific form of claim 1, wherein the lid is formed with a pour opening diametrically opposite to its hinge.

4. The combination with a sauce pan, of a lid hinged to the top edge of said pan, said lid having a portion thereof adjacent to its periphery and diametrically opposite to its hinge corrugated in the form of a series of steps with rearwardly inclined risers, said risers being formed with vent and pour holes therein.

RALPH S. DUNLAP.